A. L. HARVEY.
CONTROL SYSTEM.
APPLICATION FILED MAY 12, 1919.

1,425,646. Patented Aug. 15, 1922.

WITNESSES:
J. B. Merrill
David Rines

INVENTOR
Albert L. Harvey
BY
Wesley G. Carr
ATTORNEY

UNITED STATES PATENT OFFICE.

ALBERT L. HARVEY, OF WILKINSBURG, PENNSYLVANIA, ASSIGNOR TO WESTINGHOUSE ELECTRIC & MANUFACTURING COMPANY, A CORPORATION OF PENNSYLVANIA.

CONTROL SYSTEM.

1,425,646.  Specification of Letters Patent.  Patented Aug. 15, 1922.

Application filed May 12, 1919. Serial No. 296,563.

*To all whom it may concern:*

Be it known that I, ALBERT L. HARVEY, a citizen of the United States, and a resident of Wilkinsburg, in the county of Allegheny and State of Pennsylvania, have invented a new and useful Improvement in Control Systems, of which the following is a specification.

My invention relates to motor-control systems and particularly to systems for controlling the acceleration and the deceleration of direct-current motors.

The object of my invention is to provide a new and improved system for controlling the field excitation of shunt and compound-wound motors during acceleration and deceleration.

The resistor, which is connected in circuit with the shunt field-magnet winding, is normally short-circuited by a relay that is biased to closed position and may be opened upon the counter-electromotive force of the motor attaining a predetermined value. The resistor is thus inserted into circuit independently of the condition of the load or of any condition other than the motor speed. If the motor is provided with means for dynamic-braking, the relay will provide for strengthening the field when it is reclosed upon the counter-electromotive force of the motor falling to a predetermined value, so that the dynamic-braking current may be maintained more nearly constant. If dynamic-braking is not employed, the field winding and the relay coil may be permanently connected to the line, thus providing for a strongly excited field-magnet winding during the accelerating period but for a weakly excited winding at all other times.

Figure 1:
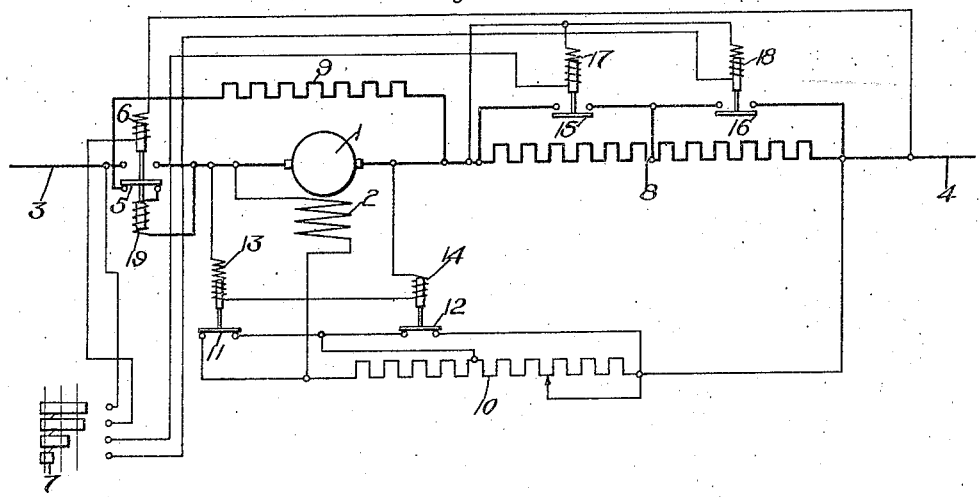
Figure 2:
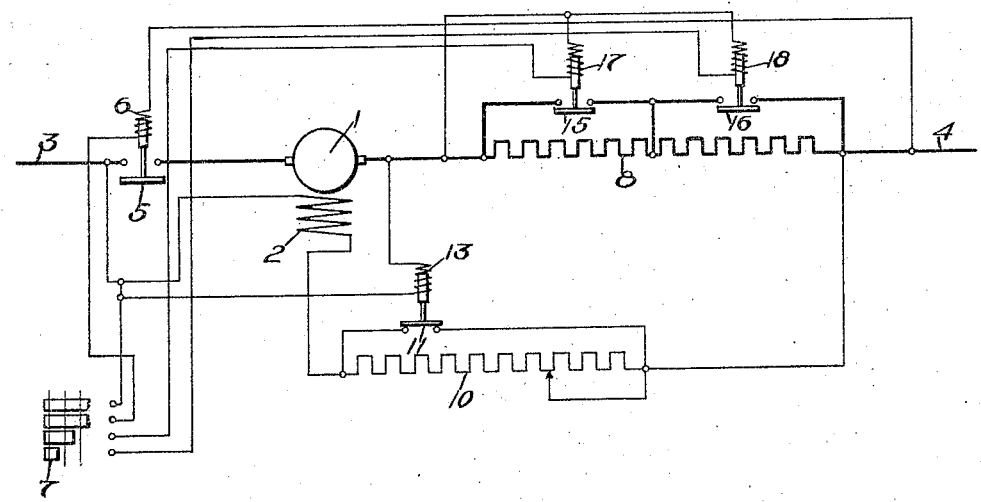

My invention will be made clear in connection with the accompanying drawings in which Figure 1 is a diagrammatic view of circuits and apparatus embodying my invention as applied to a motor that is provided with means for dynamic-braking. Fig. 2 is a diagrammatic view of a modification.

In Fig. 1, a motor, having an armature 1 and a shunt field-magnet winding 2, is connected to line conductors 3 and 4 by a line contactor 5 having an energizing coil 6, the circuit of which is under the control of a master switch 7. A resistor 8 is normally connected in series with the armature 1, a dynamic-braking resistor 9 is adapted to be connected in circuit with the armature 1 during dynamic-braking, and a resistor 10 is connected in circuit with the shunt field-magnet winding 2, though it is normally short-circuited therefrom by a relay or relays 11 and 12, two being shown in this instance for purposes of illustration, having, respectively, coils 13 and 14 that are connected across the terminals of the armature 1.

The coils 13 and 14 may have different numbers of ampere turns, in order to effect the operation of the relays 11 and 12 at different values of the counter-electromotive force of the motor or the relays may, in other ways, be adapted to respond at different times. The resistor 8 is adapted to be short-circuited by a contactor or contactors 15 and 16 having actuating coils 17 and 18, respectively, that, for purposes of illustration, are shown as connected across the motor armature in circuit with contact members under the control of the master switch 7. The line contactor 5 is adapted to occupy two positions in one of which it closes the motor circuit and in the other of which it establishes a dynamic-braking circuit, the line contactor being adapted to be maintained in the latter-named position by a coil 19 which is energized by the current traversing the dynamic-braking circuit.

In the first position of the master switch 7, the circuit of the coil 6 is closed to establish the circuit of the motor, which extends from the line conductor 3, through the line contactor 5, the armature 1 and the resistor 8 to the line conductor 4. The shunt field-magnet winding 2 is, of course, connected in parallel to the armature 1 and the resistor 8, the adjustable resistor 10 being, at this time, short-circuited by the relays 11 and 12. As the motor accelerates and its counter-electromotive force increases, in consequence, the contactors 15 and 16 are closed by the coils 17 and 18, respectively, which are energized in accordance with the counter-electromotive force of the motor, if the master switch 7 occupies its second or its third position. So long as the master switch 7 occupies its first position the contactors 15 and 16 will remain open.

With the continued rise in counter-electromotive force, the coils 13 and 14 will become sufficiently energized to effect the successive opening of the relays 11 and 12. Upon the opening of the relay 11, a portion of the adjustable resistor 10 is inserted into the circuit of the shunt field-magnet winding 2 and, upon the opening of the relay 12, the remainder of this resistor is inserted into circuit, whereby the motor speed may be increased to any desired value. The speed of the motor may thus be controlled by means of the contactors 15 and 16, which are under the control of the master switch 7, and the relays 11 and 12 which control the adjustable resistor 10.

When it is desired to stop the motor, the master switch 7 may be actuated to its illustrated or "off" position, thereby breaking the circuits of the coils 6, 17 and 18. The line contactor 5 is thereupon opened by gravity and the dynamic-braking circuit is established from one terminal of the armature 1, through the coil 19, the line contactor 5 and the dynamic-braking resistor 9, to the other terminal of the armature 1. During the early part of the dynamic-braking period, the coils 13 and 14 will be sufficiently energized to maintain the relays 11 and 12 open, so that the field-magnet winding 2 will be weakly excited. As the motor continues to decelerate, however, the coils 13 and 14 become energized by a weaker current so that, ultimately, the relays 12 and 11 will close in the order named, which is the reverse order of that in which they opened during acceleration, thereby providing for successively strengthening the excitation of the field-magnet winding 2, so that a successively stronger field is provided for the motor during the dynamic-braking period, whereby the dynamic-braking current may be maintained more nearly uniform.

In Fig. 2, I have shown a control system for a motor that is not provided with means for dynamic-braking. In order to simplify the drawing, I have shown but one relay 11, though additional relays may be employed, if desired, as in Fig. 1. The shunt field-magnet winding 2 and the coil 13 are connected, in this instance, not directly to the left-hand terminal of the armature 1, but directly to the line conductor 3, which is separated from the left-hand terminal of the armature 1 by the contactor 5. The shunt field-magnet winding 2 and the coil 13 are thus normally energized by line voltage, irrespective of the position which the contactor 5 may happen to occupy. The relay 11 is thus normally maintained open by its actuating coil 13, so that the shunt field-magnet winding 2 is normally weakly excited.

Upon the closing of the line contactor 5, in response to the actuation of the master switch 7, the armature circuit is established, whereupon the coil 13 becomes, in effect, short-circuited, so that the relay 11 is closed by gravity to effect the short-circuiting of the resistor 10. The conditions are then similar to those obtaining at the time of the closing of the contactor 5 in the system of Fig. 1, and the motor commences to accelerate in a fashion similar to that above described. Upon the counter-electromotive force of the motor reaching a predetermined value, the relay 11 is opened by the coil 13 to effect the reinsertion into the circuit of the shunt field-magnet winding 2 of the resistor 10.

In the system of Fig. 2, therefore, the shunt field-magnet winding 2 is weakly excited when the motor is at rest and when the motor is running at any desired normal speed but it becomes strongly excited during the accelerating period.

I claim as my invention:

1. The combination with an electric motor having a shunt field-magnet winding, and a resistor in series therewith, of a dynamic-braking resistor and a switch biased to its closed position to effect the shunting of said field resistor, said switch having an actuating coil energized in accordance with the counter-electromotive force of said motor to control a shunt circuit for said resistor during acceleration and during dynamic braking of said motor.

2. The combination with an electric motor having a shunt field-magnet winding and a resistor in circuit therewith, of a dynamic-braking circuit for said motor and means for rendering said field resistor effective or ineffective according as the counter-electromotive force of said motor exceeds or falls below a predetermined value during acceleration and during dynamic braking of said motor.

3. The combination with an electric motor having an armature, a dynamic-braking resistor associated therewith, and a shunt field-magnet winding having a resistor in series therewith, of a switch biased to closed position to effect the short-circuiting of said field resistor and having a coil connected across said armature for opening said switch to insert said field resistor into circuit.

4. The combination with an electric motor having an armature and a shunt field-magnet winding, a dynamic-braking resistor, and a resistor in circuit with said field-magnet winding, of means for rendering said resistor effective during acceleration of said motor when the counter-electromotive force of said motor exceeds a predetermined value and for gradually rendering said resistor ineffective during dynamic braking of said motor when the counter-electromotive force of the motor falls to predetermined values.

5. The combination with an electric motor having a shunt field-magnet winding and a resistor therefor, of a dynamic-braking resistor, and means for connecting the field resistor in circuit during acceleration and for gradually shunting said field resistor during dynamic braking of said motor.

6. The combination with an electric motor having a shunt field-magnet winding and a resistor therefor, of a dynamic-braking resistor, and means controlled by the counter-electromotive force of the motor for inserting the field resistor to accelerate the motor and for gradually shunting said field resistor during dynamic braking.

In testimony whereof, I have hereunto subscribed my name this 30th day of April 1919.

ALBERT L. HARVEY.